United States Patent [19]

Toguchi et al.

[11] Patent Number: 5,839,009
[45] Date of Patent: Nov. 17, 1998

[54] CAMERA HAVING DATA IMPRINTING FUNCTION

[75] Inventors: Michi Toguchi; Tatsuya Suzuki; Akira Inoue, all of Tokyo, Japan

[73] Assignee: Olympus Optical Co. Ltd., Tokyo, Japan

[21] Appl. No.: 935,410

[22] Filed: Sep. 23, 1997

Related U.S. Application Data

[63] Continuation of Ser. No. 614,328, Mar. 12, 1996, abandoned, which is a continuation of Ser. No. 306,244, Sep. 14, 1994, abandoned, which is a continuation of Ser. No. 119,944, Sep. 10, 1993, abandoned.

[30] Foreign Application Priority Data

Sep. 14, 1992 [JP] Japan ............................. 4-244958

[51] Int. Cl.⁶ ...................................................... G03B 1/18
[52] U.S. Cl. ................................................ 396/408; 396/392
[58] Field of Search ................................. 396/387, 392, 396/406, 407, 408, 310, 311, 315, 318, 319

[56] References Cited

U.S. PATENT DOCUMENTS

| Re. 34,452 | 11/1993 | Taniguchi | 354/21 |
|---|---|---|---|
| 4,494,842 | 1/1985 | Kimura et al. | 354/214 X |
| 4,832,275 | 5/1989 | Robertson | 354/275 |
| 4,834,306 | 5/1989 | Robertson | 354/275 |
| 5,019,843 | 5/1991 | Ogawa et al. | 354/106 |
| 5,049,908 | 9/1991 | Murakami | 354/106 X |
| 5,148,197 | 9/1992 | Kunishige | 354/106 |
| 5,182,590 | 1/1993 | Kaihara et al. | 354/106 |
| 5,270,755 | 12/1993 | Ohno et al. | 354/106 |
| 5,337,108 | 8/1994 | Kaihara et al. | 354/218 |
| 5,371,561 | 12/1994 | Sato et al. | 354/105 |
| 5,396,305 | 3/1995 | Egawa | 354/76 |

FOREIGN PATENT DOCUMENTS

| 54-47439 | 4/1979 | Japan . |
|---|---|---|
| 60-166937 | 8/1985 | Japan . |

*Primary Examiner*—Eddie C. Lee
*Assistant Examiner*—Nichoas T. Tuccillo
*Attorney, Agent, or Firm*—Frishauf, Holtz, Goodman, Langer & Chick

[57] ABSTRACT

A film movement detecting section detects an amount of movement of a film from a top end of a film cut-out portion by a film movement detecting element. A film position comparing section compares whether the film is moved to a target position of a date imprint, and a light-emitting element of a date imprint section imprints a date onto a surface of the film. A storing section for storing quantity of initial film (non-exposed) feeding stores a quantity of initial film (non-exposed) feeding when the film is mounted. A control section for controlling initial film (non-exposed) feeding controls a film feeding section so as to feed the film. A film driving device drives a shaft of a film cartridge to wind up the film.

4 Claims, 11 Drawing Sheets

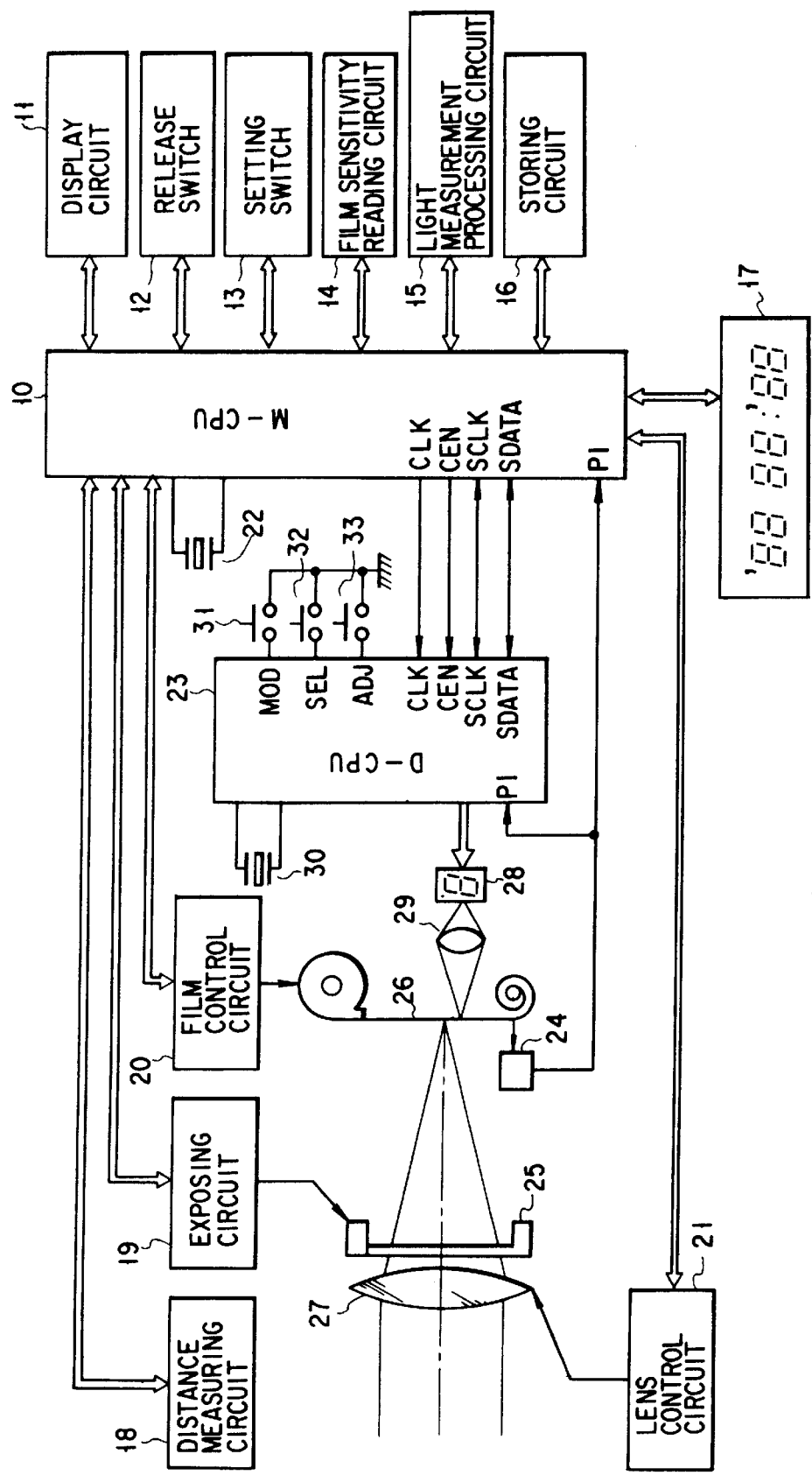
F I G. 4

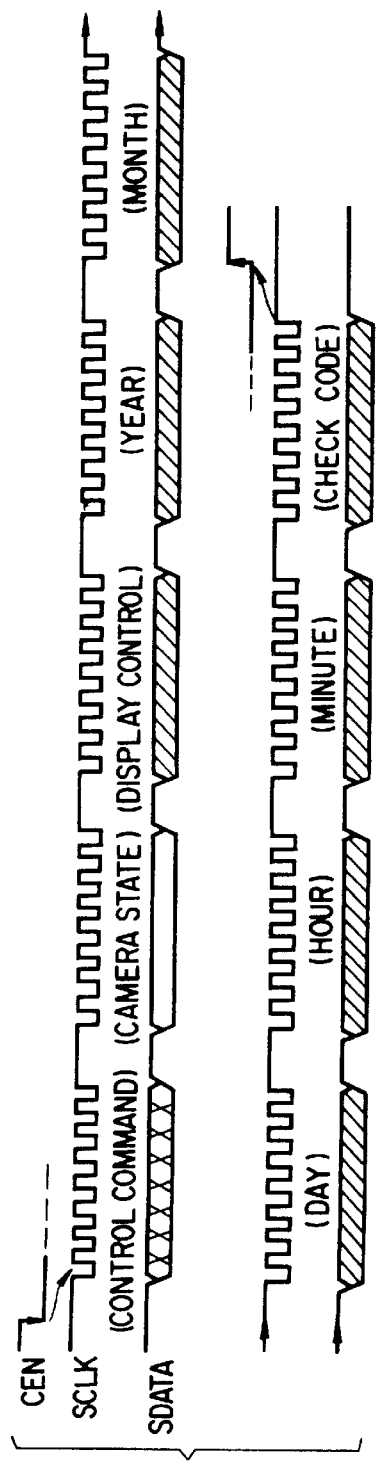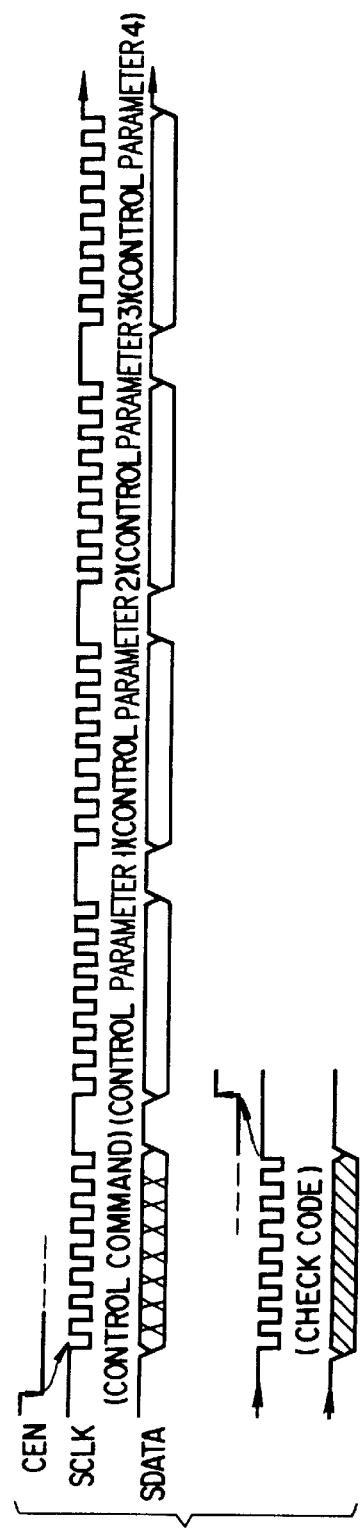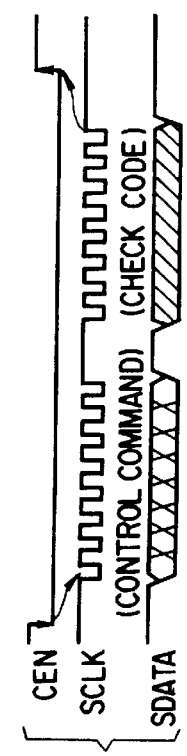

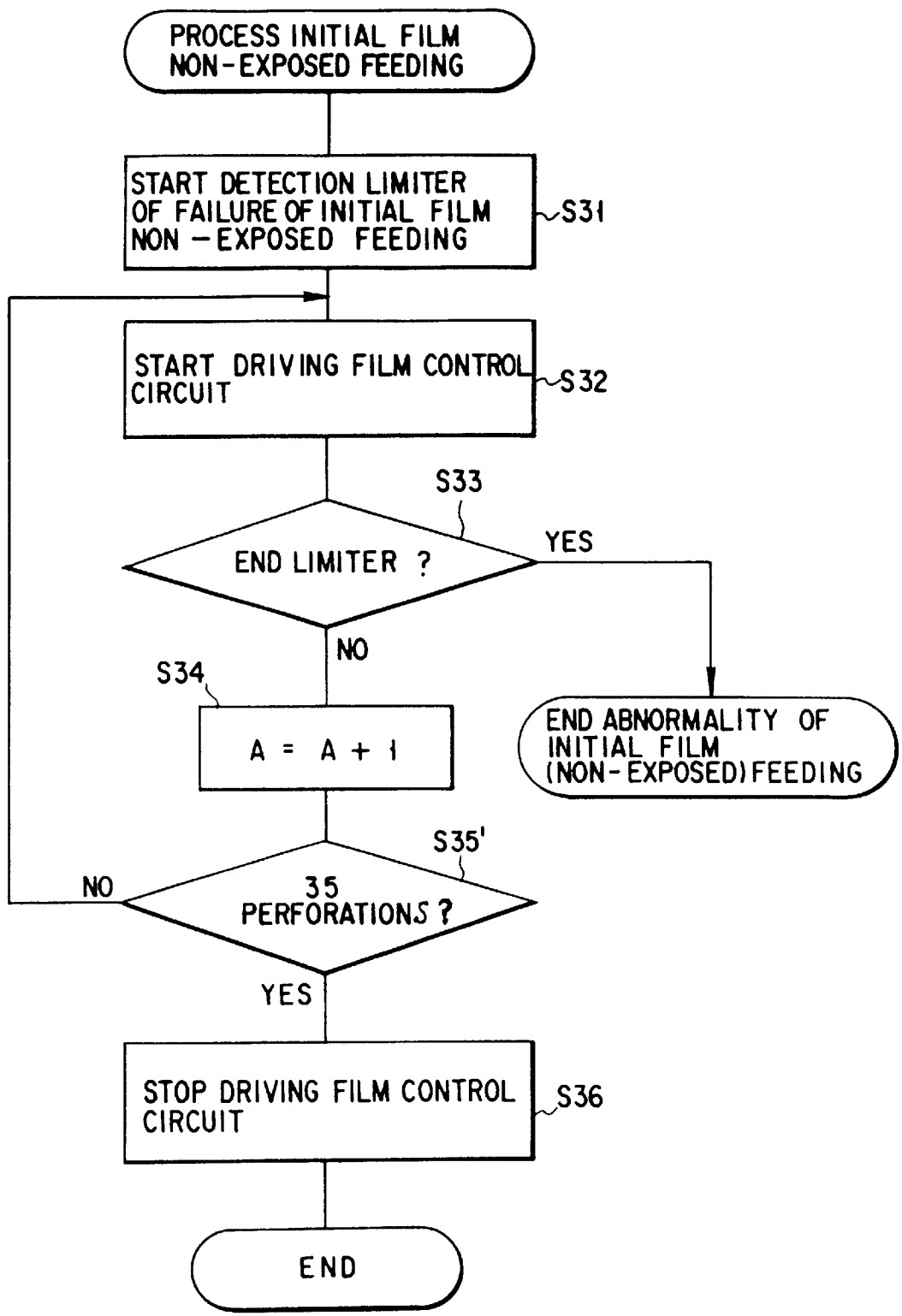
F I G. 15

5,839,009

CAMERA HAVING DATA IMPRINTING FUNCTION

This application is a Continuation of application Ser. No. 08/614,328, filed Mar. 12, 1996 (abandoned), which in turn is a Continuation of application Ser. No. 08/306,244, filed Sep. 14, 1994 (abandoned), which is a Continuation of application Ser. No. 08/119,944, filed Sep. 10, 1993 (abandoned).

BACKGROUND OF THE INVENTION

1. Field of the Invention

The present invention relates to a camera having a data imprinting function and more particularly to a camera having a data imprinting function which can imprint data such as a date on a surface of a running film by synchronizing with the running of the film and emitting a light-emitting element.

2. Description of the Related Art

As a prior art, there is used a camera, which synchronizes with the running of a film and drives a light-emitting element, and imprints data such as a date on the surface of the running film, as described in U.S. Pat. No. 5,019,843. This type of camera emits light from a plurality of LEDs arranged in one row in a direction perpendicular to the film winding direction while the film is being wound up, thereby imprinting data. This type of the camera solves the following problem.

More specifically, the film is stretched while data is imprinted onto a final image frame, and an automatic rewinding operation is started in a state that data is not completely imprinted onto the final image frame. As a result, data is partially imprinted, and an extremely unclear picture is formed.

Moreover, this type of the camera has a function of reading a number of film defined frames from a DX code of a film cartridge, and detecting the defined final imaging film by the count content of counting means for counting the number of the film defined frames and the number of imaging frames, and limiting the defined final imaging frame to one frame.

However, in the above-mentioned prior art, since there must be provided reading means for reading the number of the film defined frames from the DX code of the film cartridge, the size of the camera is enlarged. Due to this, the manufacturing cost increases. Therefore, it is difficult to miniaturize the camera and reduce the manufacturing cost.

Moreover, in the case of the film with 36 frames, some larger number of frames than the defined number of frames, for example, 37 frames can be often exposed. However, in the prior art, photographing and imprinting cannot be performed after the defined number of frames.

SUMMARY OF THE INVENTION

In consideration of the above problem, the present invention has been made, and an object of the present invention is to provide a camera having a data imprinting function, which can prevent failure in data imprint by a simple mechanism without enlarging the size of the camera, and which can photograph and imprint data without reading a DX code even if the number of frames exceeds the defined number of frames.

According to the present invention, there is provided a camera comprising: imprinting means for imprinting data on a surface of a film being wound up by driving light emitting means a plurality of times; executing means for executing a predetermined quantity of an initial film feeding in accordance with a film mounting operation; and setting means for setting quantity of the initial film feeding executed by the executing means as quantity of winding after imaging a final image plane of the film such that a film running necessary for data imprinting by the imprinting means can be provided but running for winding up one frame can not be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a schematic block diagram of a 35 mm camera to which the data imprinting camera of the present invention is applied;

FIGS. 9A to 9C are time charts explaining a main microcomputer and communication means of a date microcomputer;

FIG. 14 is a flow chart of a sub-routine explaining the operation of inset; and

FIG. 15 is a flow chart explaining the operation of initial film (non-exposed) feeding processing according to a second embodiment of the invention.

DETAILED DESCRIPTION OF THE PREFERRED EMBODIMENTS

Figure 1:
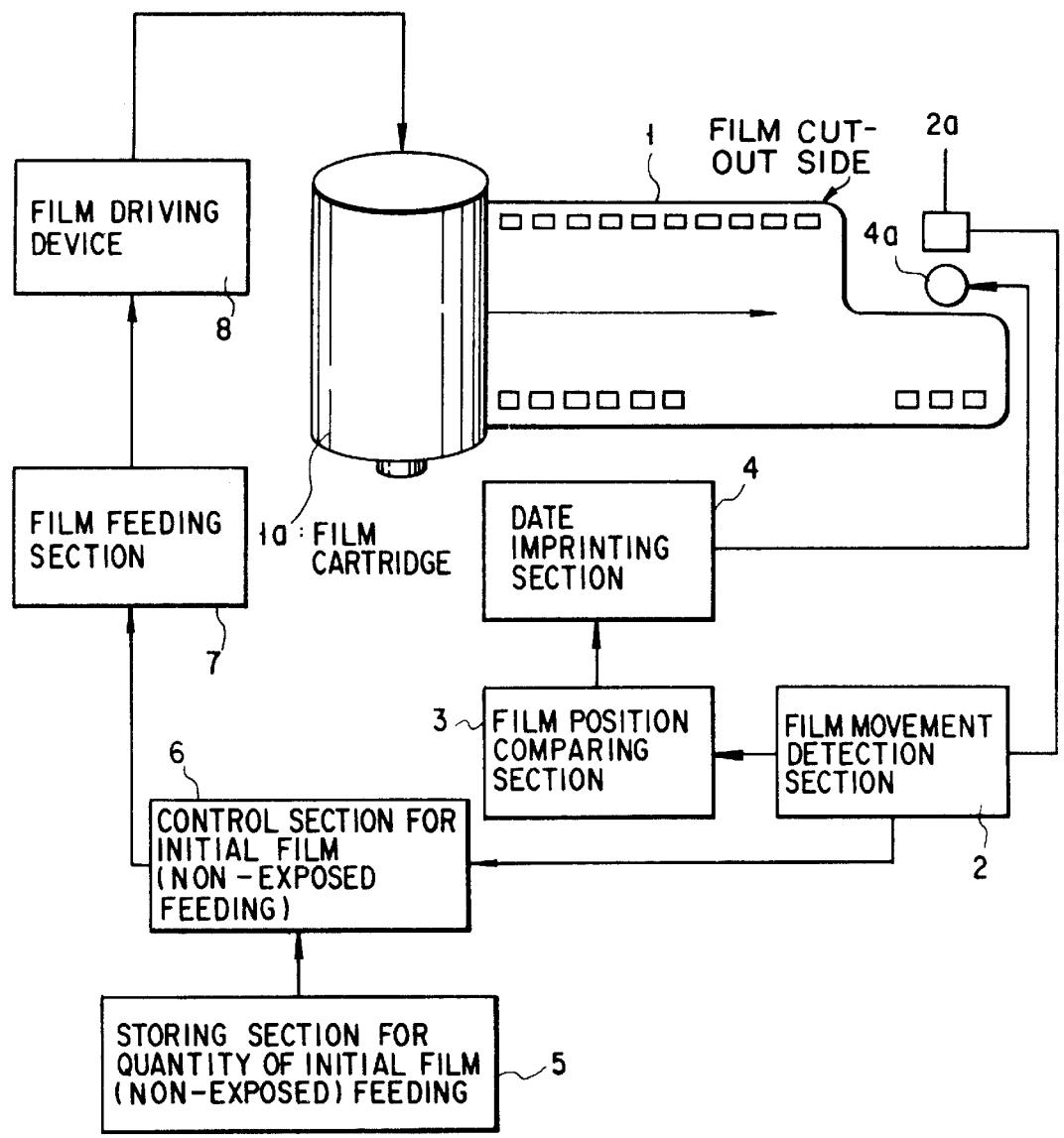
FIG. 1 is a block diagram showing a concept of a date imprinting camera according to a first embodiment of the present invention.

Reference will now be made in detail to the presently preferred embodiments of the invention as illustrated in the accompanying drawings, in which like reference characters designate like or corresponding parts throughout the several drawings.

FIG. 1 is a block diagram showing the concept of a date imprinting camera according to a first embodiment of the present invention.

In this drawing, the date imprinting camera comprises a film movement detecting section 2 having a film movement detecting element 2a for detecting quantity of movement of a film 1 from a top end of a film short hub aide or a film cut-out side a film position comparing section 3 for comparing whether the film 1 is moved to a target position of a date imprinting, and a date imprinting section 4 which sends an imprinting command to a light emitting diode 4a by the film position comparing section 3, and imprints a date onto a surface of the film.

The data imprinting camera further comprises a storing section 5 for storing quantity of initial film (non-exposed) feeding when the film is mounted, a control section 6 for executing the operation of initial film (non-exposed) feeding based on the stored value of the storing section 5 and an output of the film movement detecting section 2, a film feeding section 7 for feeding the film 1 by the control of the control section 6, and a film driving device 8, which drives a shaft of a film cartridge la to wind up the film 1 by the film feeding section 7.

The film movement detecting section 2 detects the quantity of movement of the film 1 moved by the film feeding section 7 from the top end of the film cut-out side by the film movement detecting element 2a. The date imprint section 4 sends an imprinting command to the light emitting diode 4a, which is in the vicinity of the film 1, by the film position comparing section 3, and optically imprints a date onto the surface of the running film when the film 1 is wound up by the film feeding section 7.

Further, the control section 6 controls the film feeding section 7 to execute the operation of initial film (non-exposed) feeding based on the stored value of the storing section 5, which is stored in the storing section 5 when the film is mounted, and the output of the film movement detecting section 2.

Figure 2:
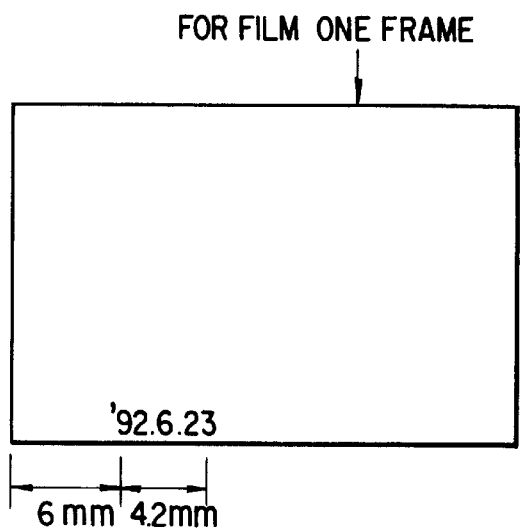
FIG. 2 is a view explaining quantity of winding up a film used in the date imprinting camera, and showing the length, which is from a film end to a head of a character.
Figure 3:
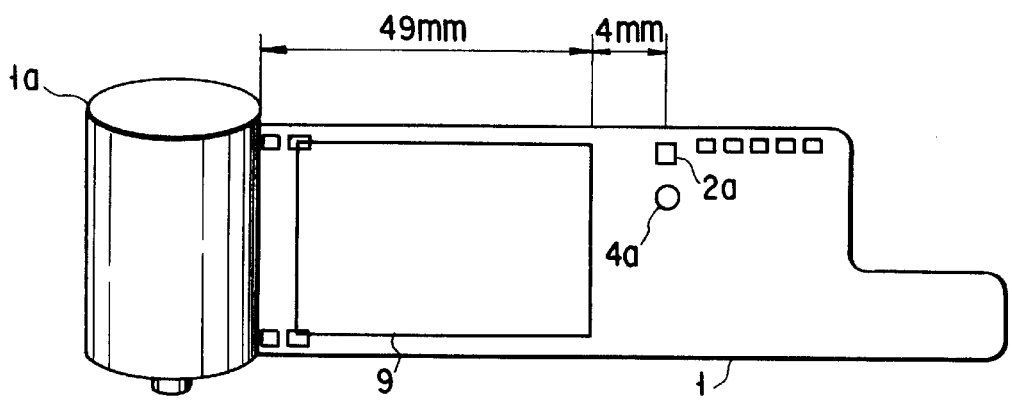
FIG. 3 is a view explaining quantity of winding up a film used in the date imprinting camera, and showing the distance between an aperture of the camera and a light emitting section of a light emitting diode.

FIGS. 2 and 3 will explain quantity of winding up film.

As one example of the date imprinting while being wound up, at least 14.2 mm (three perforations) are needed for the quantity of film winding. With reference to FIG. 2, a length, which is from the film end to the head of a character of the date to be imprinted, is 6 mm, and a length of the characters is 42 mm. Also, as shown in FIG. 3, the distance between an aperture 9 of the camera and a light emitting section of the light emitting diode 4a is 4 mm. Therefore, the quantity of film winding is 4 mm+6 mm+4.2 mm=14.2 mm. The value of 14.2 mm corresponds to perforations.

However, if the quantity of winding up the final frame of the film is 14.2 mm (3 perforations), there is no film end that is used to determine imprinting of the date. If the quantity of winding up the final frame of the film is 3 perforations and below 8 perforations, the date imprint can be executed. It is noted that one frame has 8 perforations.

Also, the full length of the film can be obtained by the following equation:

Full Length of Film=(Length of One Frame×Number of Photographable Frames)+Quantity of Initial Film (non-exposed) Feeding+Extra Length.

In this case, if the quantity of initial film (non-exposed) feeding is set to four frames (32 perforations), the minimum value of winding the final frame of conventionally sold film with 12 exposures, 24 exposures, or 36 exposures, has been 1 or more perforations and the maximum value thereof is 5 perforations. However, if the quantity of winding up the final frame is present at 3 perforations, the imprint cannot be completely ended, that is two perforations are lacking for imprinting the date. With the present invention, the above-mentioned (length of one frame×number of Imaging frames) is a constant, two perforations are replenished from the quantity of initial film (non-exposed) feeding of 32 perforations, so that the data imprinting can be surely executed.

As mentioned above, the quantity of initial film (non-exposed) feeding is changed from 32 perforations to 30 perforations, two perforations are added to five perforations of the maximum value of the quantity of winding up the final frame, and seven perforations are obtained. Therefore, if the quantity of initial film (non-exposed) feeding is set to 30 perforations, the quantity of winding up the final frame of the film having 1 or more perforations and below 8 perforations can be obtained, so that the date can be surely imprinted onto the final frame.

In other words, if the length of one frame is L and the quantity of winding up the film necessary for imprinting is D, and the quantity of winding up the final frame is R, the quantity of initial film (no-exposed) feeding may set to satisfy $L > R \geq D$.

The specific structure and operation of a first embodiment of the present invention will be explained as follows.

FIG. 4 is a block diagram showing the outline of a 35 millimeter camera to which the date imprint camera of the present invention is applied. A main micro-computer (hereinafter called as an M-CPU) 10 performs a sequence control of the whole camera system and various types of calculations. A display circuit 11, a release switch 12, a setting switch 13, a film sensitivity reading circuit 14, a light measurement processing circuit 15, a storing circuit 16, a date display circuit 17, a distance measuring circuit 18, an exposing circuit 19, a film control circuit 20, and a lens control circuit 21 are respectively connected to the M-CPU 10 through a bus. Further, an oscillator 22 for generating an operation clock of the M-CPU 10, a date micro-computer (hereinafter called as a D-CPU) 23, and a film movement detecting section 24 are connected to the M-CPU 10.

The display circuit 11 displays the operation mode of the camera, exposure data, the number of frames of projection film. The release switch 12 is a switch of a two-stage type stroke. Specifically, the measurement of distance is performed by turning on the first-stage switch, and the exposing operation is performed by turning on the second-stage switch. The setting switch 13 is used to set the operation mode of the camera. The film sensitivity reading circuit 14 reads a DX code of a film 26, and sends an SV signal to the M-CPU 10.

The storing circuit 16 is a nonvolatile memory for storing data of such as the number of frames of the film 26, and the operation mode of the camera, which are necessary to be stored even when power is off. The date display circuit 17 performs the display of date data of six digits based on data sent from the D-CPU 23 through the M-CPU 10.

The distance measuring circuit 18 sends data, which is necessary for the measurement of distance to an object, to the M-CPU 10. The exposing circuit 19 controls a lens shutter 25 having functions of an aperture and a shutter.

The film control circuit 20 automatically winds up the film 26 and rewinds the film based on the control signal of the M-CPU 10. The lens control circuit 21 drives a projection lens 27 based on the control signal of the M-CPU 10. An image of the object is image-formed on the film 26.

The film movement detecting section 24 sends a pulse signal, which corresponds to the quantity of movement of the film 26, to the M-CPU 10 and the D-CPU 23. The M-CPU 10 controls the automatic winding of the film 26 and rewinding thereof.

The D-CPU 23 is the microcomputer for imprinting date data onto the film. The D-CPU 23 imprints date data onto the film 26 by use of a 7-segment LED 28 and an imprinting lens 29 based on the control signal of the M-CPU 10. The imprinting is performed by synchronizing with the pulse signal sent from the film movement detecting section 24.

The oscillator 30 generates an operation clock of the D-CPU 23. By counting the clock, the D-CPU 23 creates data for imprinting "year", "month", "day", "hour" and "minute." Switches 31, 32, and 33 are a mode switch (MOD) switch, a select (SEL) switch, and an adjust (ADJ) switch, respectively. A user of the camera can execute the selection of imprinting mode and correction of imprinting data by operating these three switches. Since the selection state of the imprinting mode and the correction state are displayed by the date display circuit 17, the user may use three switches 31, 32 and 33 as confirming the display as explained later.

The operation of the D-CPU 23 is controlled by four control signal lines CLK, CEN, SCLK, and SDATA. The CLK line is used to send the clock to the D-CPU 23 from the M-CPU 10.

The D-CPU 23 may perform only the counting operation of a timer while the operation of the M-CPU 10 is stopped. Therefore, the D-CPU 23 executes the minimum necessary operation at the minimum necessary speed by use of the operation clock of the oscillator 30. Thereby, the power consumption of the system can be controlled to be the minimum necessary level. Of course, in the control of date imprinting onto the film 26, and the control based on the user's switch operation other than the count operation of the timer must be performed while the M-CPU 10 is working. Due to this, under this state, the processing speed of the D-CPU 23 for the operation clock of the oscillator 30 is slow.

Therefore, under this state, the D-CPU 23 must be operated by the operation clock sent from the M-CPU 10. If the D-CPU 23 always uses the clock sent from the M-CPU 10 as the operation clock at the high-speed operation, it is unnecessary to provide the above-mentioned two oscillators.

The CEN line is used such that the M-CPU 10 transmits a communication request signal to the D-CPU 23. The SCLK line and the SDATA line are a mutual communication signal line, which is used to transmit serial data.

Figure 5:
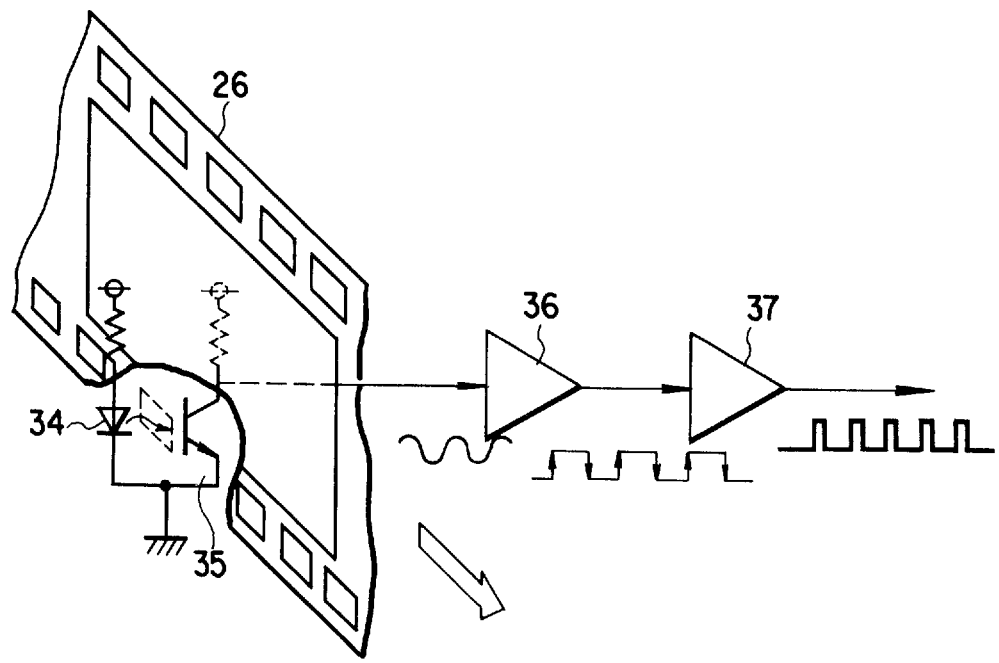
FIG. 5 is a view showing the structure of a film movement detecting section of FIG. 4.

FIG. 5 shows the structure of the film movement detecting section 24 of FIG. 4. In FIG. 5, a photo interrupter, which is formed of an infrared light emitting diode 34 and a phototransistor 35, are arranged such that the film 26 is sandwiched between both sides of the photo-interrupter. The perforations are passed therethrough, thereby outputting a signal, which corresponds to the quantity of movement of the film 16. The signal is wave-shaped by the pulse signal by a wave-shaping circuit 36, and converted to a pulse signal having double periods by a multiply circuit 37. The pulse signal is counted, so that the M-CPU 10 and the D-CPU 23 can detect the quantity of the movement of the film 26.

Figure 6:
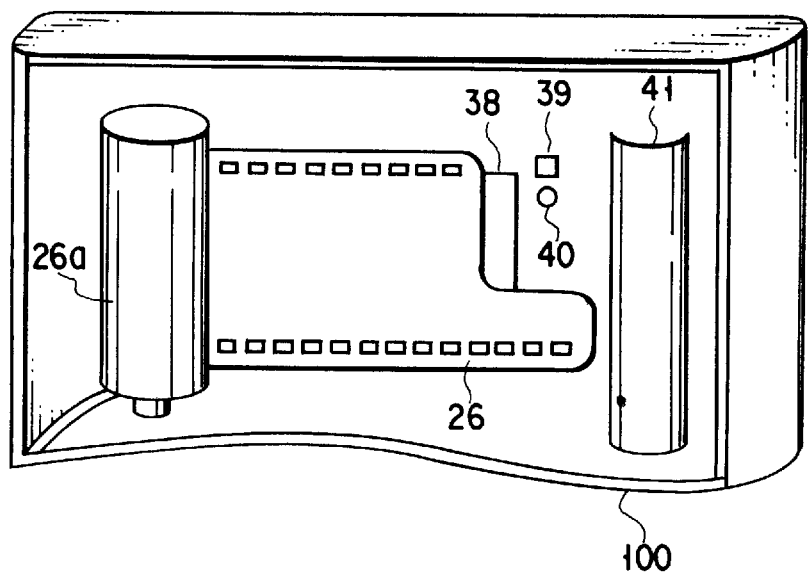
FIG. 6 is a schematic view showing a state in which a film is mounted onto the camera, seen from the back of the camera.

FIG. 6 is a schematic view showing a state in which the film is mounted onto the camera, seen from the back of a main body 100 of the camera. In this drawing, a rear cover of the main body 100 of the camera is omitted.

A film cartridge 26a of the film 26 is contained at the left side of the main body 100 of the camera. The film 26 runs along an aperture 38 of the main body 100 of the camera and passes on a film movement detecting section 39 and an imprinting device 40, and is wound up by a spool 41. The film movement detecting section 39 is provided close to the spool, and at a position where the film movement detecting section 39 does not contact the film 26 at the time of replacing the film 26 with a new one, and close to the spool 41.

In other words, as shown in FIG. 6, the top of the film at the short hub side does not reach to the film movement detecting section 39 at the time of replacing the film with a new one. Therefore, the film movement detecting section 39 can correctly detect the quantity of the movement of the film 26 from the first perforation of film at the cut-out side. Therefore, if the film movement detecting section 39 is placed at the position where the film movement detecting section 39 is covered with the film 26 in the film mounting state, the film movement detecting section 39 cannot correctly detect the quantity of the movement of the film 26 from the first perforation of film cut-out section.

A feed-out typed film as proposed in U.S. Pat. Nos. 4,832,275 or 4,834,306 is useful so that the position of the film movement detecting section is not limited.

Figure 7:
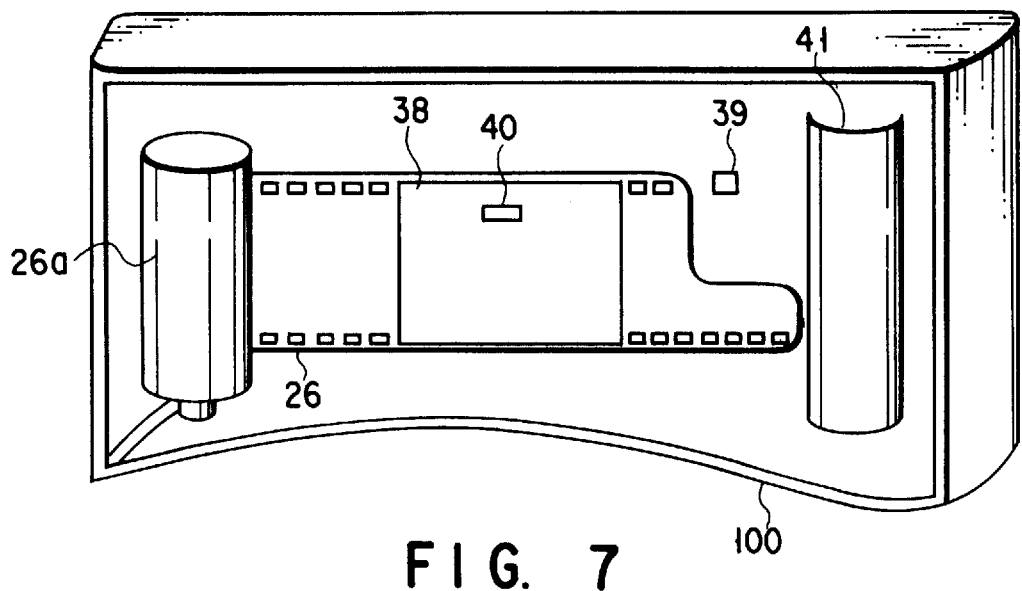
FIG. 7 is a schematic view showing the other embodiment in a state in which the film is mounted onto the camera.

An imprinting device 40 shown in FIG. 6 is positioned at the outside of the aperture 38. FIG. 7 shows a case that the imprinting device 40 is positioned at the inside of the aperture 38.

More specifically, FIG. 7 is a schematic view showing the other embodiment in a state that the film is mounted onto the camera. In FIG. 7, the film movement detecting section 39 must be located at the same position as the position shown in FIG. 6 in order to detect the quantity of the movement of the film 26 from the first perforation of film at the cut-out side. However, the position of the imprinting device 40 is not limited to the outside of the aperture 38 since the imprinting device 40 aims at imprinting the date on the film 26. Therefore, the imprinting device 40 may be provided at the position where the date can be imprinted on the running film 26.

Figure 8:
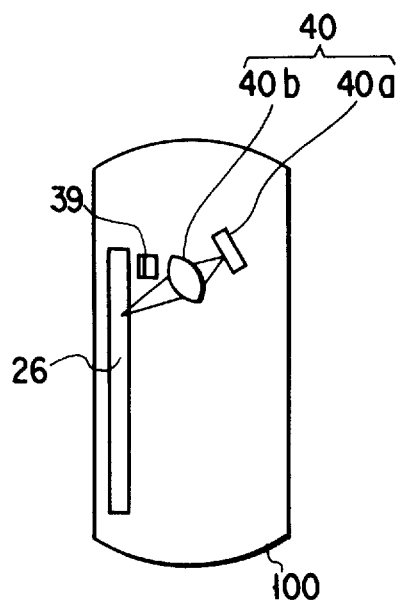
FIG. 8 is a view showing the camera of FIG. 7, seen from the cross section.

FIG. 8 is a view showing the main body 100 of the camera of FIG. 7, seen from the cross section. The imprinting device 40 comprises a light emitting section 40a for light-emitting data, and an imprinting lens 40b for image-forming data on the film 26. The imprinting device 40 imprints the characters on the film 26 by use of the light emitting section 40a and the imprinting lens 40b.

Unlike the film movement detecting section 39, the position of the imprinting device 40 is not fixed. The imprinting device 40 may be provided at the position where the date can be imprinted on the film 26.

FIGS. 9A, 9B, and 9C will explain the communicating manner between the M-CPU 10 and the D-CPU 23. Regarding the direction of data communication in FIGS. 9A to 9C, the portion shown by the slanting lines shows the communication to the M-CPU 10 from the D-CPU 23, and other portions show the communication to the D-CPU 23 from the M-CPU 10.

The M-CPU 10 sets the CEN line to a high (H) level from a low (L) level, thereby the communication is started. Since a communication request is generated from only M-CPU 10, the relationship between the M-CPU 10 and the D-CPU 23 is maintained to correspond to the relationship between the master and slave.

After setting a CEN line to the L level, the M-CPU 10 waits standby for a predetermined period of time. Thereafter, the M-CPU 10 synchronizes with a signal of a SCLK line, and outputs a control command onto a SDATA line. In consideration of the processing speed of the D-CPU 23, the waiting time is determined. The control command is used such that the D-CPU 23 discriminates the communication mode. Therefore, the control command is positioned at the head of communication data in any communication mode. A communication mode A will be explained with reference to FIG. 9A.

The M-CPU 10 outputs a code corresponding to the communication A as a control command, which is first data. Then, the M-CPU 10 outputs data including the state of the camera. Based on data including the state of the camera, the D-CPU 23 can discriminate whether the M-CPU 10 is in a normal operation or a standby mode.

When the M-CPU 10 finishes the above two data outputs, the D-CPU 23 outputs six data, which is necessary for displaying the date on the date display circuit 17, to the M-CPU 10. After outputting the above six data, the D-CPU 23 outputs a check code, and data outputting is ended. By inputting the check code, the M-CPU 10 discriminates that the communicating operation is ended, and sets the CEN line to the H level from the L level. In any communication modes, the M-CPU 10 inputs the check code, thereby the communicating operation is ended.

The following will explain the above-mentioned six data.

First display control data is 8-bit data showing the display method on the date display circuit 17. Continuously, five data showing "year", "month", "day", "hour" and "minute" is outputted. In other words, five data show the content of a time counter for counting a time reference clock, which is generated in the D-CPU 23. The M-CPU 10 discriminates which data of five data should be displayed on the date display circuit 17 (display mode) by the upper 4-bits of the above display control data.

Table 1 shows the corresponding relationship between upper 4-bit data of display control data and the display mode.

TABLE 1

|   | Upper 4-bit Data | Display Mode |
|---|---|---|
| 1 | 0 0 0 0 | Display Off Mode |
| 2 | 0 0 0 1 | "Year", "Month", "Day" display mode |
| 3 | 0 0 1 0 | "Month", "Day", "Year" display mode |
| 4 | 0 0 1 1 | "Day", "Month", "Year" display mode |
| 5 | 0 1 0 0 | "Day", "Hour", "Minute" display mode |

Upper 4-bit data also shows the imprint mode, which is used when the D-CPU 23 imprints date data on the film 26. The Display mode is changed as in "1"→"2"→ . . . →"5"→"1" every time the MOD switch 31, which is connected to the D-CPU 23, is turned on.

Lower 4-bit data of the above display control data will be explained as follows.

Lower 4-bit data shows that the M-CPU 10 discriminates which digit of six digits on the date display circuit 17 should be flickered (flicker mode). Table 2 shows the corresponding relationship between the above data and the flicker mode.

TABLE 2

|   | Lower 4-bits Data | Flicker Mode |
|---|---|---|
| 1 | 0 0 0 0 | Prohibition of Flicker |
| 2 | 0 0 1 0 |  |
| 3 | 0 1 0 0 |  |
| 4 | 1 0 0 0 |  |

In Table 2, the digit shown by the slanting lines is flickered. The flicker mode is changed as in "1"→"2"→"3"→"4"→"1" every time the SEL switch 32, which is connected to the D-CPU 23, is turned on.

The user operates the SEL switch 32, and sets the predetermined digit to be in a flicker state. Then, the user operates the ADJ switch 33, which is connected to the D-CPU 23. As a result, the D-CPU 23 changes the content of the time counter corresponding to the flickering digit, and outputs the changed data to the M-CPU 10. Therefore, the user can change date data as confirming the date by the date display circuit 17.

The communication mode B will be explained with reference to FIG. 9B.

The M-CPU 10 outputs a code corresponding to the communication B as a control command, which is first data. Then, the D-CPU 23 outputs 4-byte of control parameters 1, 2, 3, 4, which are necessary for imprinting date data on the film 26. Table 3 shows the data content of the control parameters 1, 2, 3, 4.

TABLE 3

|  | Data Content | |
|---|---|---|
| Control Parameter 1 | Imprinting Standard Time; STDTM | |
| Control Parameter 2 | Film Sensitivity Coefficient; FKS | Measuring Start Timing; STRTM |
| Control Parameter 3 | Imprinting Delay Time; TMDLY | |
| Control Parameter 4 | Imprinting Distance Coefficiency; ITVK | Imprinting Format; PRFLAG |

The imprinting time for one digit of date data (that is, light emitting time of the seven segment LED 28) is determined by the imprinting standard time STDTM of the control parameter 1 and the film sensitivity coefficient of upper nibble FSK. Therefore, STDTN×FSK=light emitting time can be obtained.

The measuring start timing STRTM of the lower nibble of the control parameter 2 shows the position where the measurement of the moving speed of the film 26 is started. If the M-CPU 10 starts the automatic loading of the film 26, the film movement detecting section 39 outputs a pulse signal. The D-CPU 23 starts the measurement of the film moving speed at the time when the first pulse signal is detected and the number of pulse signals shown by STRTM is inputted. The reason why the detection of the moving speed for STRTM pulse is prohibited is that the moving speed of the film 26 in the initial state of the automatic loading is not stable.

The distance between the pulse signals is measured by the timer, so that the D-CPU 23 detects the speed of the film 26. The value of the timer is TFV. After detecting the film moving speed, the D-CPU 23 waits for imprinting the delay time (TMDLY) of the control parameter 3, and starts the imprinting.

Therefore, it is determined which portion of the film 26, imprinting data is imprinted by data set by STRTM and TMDLY. The distance between the numerical values to be imprinted is determined by the imprinting distance coefficient (ITVK) of the upper nibble of the control parameter 4 and TFV. In other words, date data is imprinted one digit by one digit by the time distance determined by TFV×ITVK. The imprinting format (PRFLAG) of the control parameter 4 is used to select whether date data is started to imprint from the lower digit or the upper digit. This is data, which is determined by the position of the 7-segment LED 28 and the moving direction of the film 26.

The communication mode C will be explained with reference to FIG. 9C. In the communication mode C, the code corresponding to the communication mode C is used as a control code, and the M-CPU 10 outputs the control code.

The communication mode C is the mode, which is executed right before the M-CPU 10 provides the instruction to wind up the film 26. The D-CPU 23 can detect the timing of winding up the film 26 by receiving the communication.

An operation of the M-CPU 10 will be explained with reference to the flow chart of FIG. 10.

In step S1, after power is turned on and the M-CPU 10 is reset, the first initialization is performed. In step S2, the D-CPU 23 starts the output of the operation clock, which is necessary for the high speed operation. In step S3, two timers are set, and start counting.

One of two timers is a display timer. The display timer is initialized every time when the user operates the switch of the camera. Then, if no switching operation is performed, and the timer counter overflows for a predetermined time (for example, 30 seconds), the M-CPU 10 is set to be in a standby mode in order to reduce power consumption. The other timer is a timer of 100 msec, and is used as a synchronizing signal to periodically input date data from the D-CPU 23.

In step S4, it is discriminated whether or not a rear cover (not shown) of the main body 100 of the camera is changed from an opening state to a closing state. If it is discriminated that the rear cover is changed from the opening state to the closing state, the processing of the initial film (non-exposed) feeding is performed in step S5. If it is discriminated that the rear cover is not changed, the processing in step S5 is skipped.

In step S6, it is discriminated whether or not the display timer overflows. If the display timer overflows and the operation of the display timer is ended, an operation goes to a step S7. In step S7, a communication of communication mode A is performed. This means that the M-CPU 10 enters a standby mode based on data of a camera state.

In step S8, the output of the clock for the high speed operation of the D-CPU 23 is stopped. In step S9, in order to inform the user that the present mode is the standby mode, all display is turned off. In step S10, after allowance of interruption is performed, the M-CPU 10 is set to be in the standby mode, and the operation is stopped. In order to start the operation, the user may operate the switch and generate an interruption signal. If the interruption signal is generated, the standby mode is released, and the M-CPU 10 starts the operation from step S2.

In step S6, if the display timer does not overflow, the operation goes to step S11 from step S6. In step S11, it is discriminated whether or not the timer of 100 msec overflows. Then, if the timer overflows, and the operation is ended, the operation goes to step S12. If the timer does not overflow, the operation goes to step S15 to be explained later.

In step S12, the communication of communication mode A is performed, and data, which is necessary for displaying date, is inputted from the D-CPU 23. In step S13, date is displayed on the date display circuit 17 based on inputted data. Also, the display corresponding to the operation mode of the camera is performed on the display circuit 17. Then, in step S14, the timer of 100 msec is initialized, and the counting is started.

By the operations of steps S11 to S14, the display of the date display circuit 17 and that of the display circuit 11 are renewed so as to correspond to the operation of the M-CPU 10 and that of the D-CPU 23.

In step S15, the state of the setting switch 13 is inputted. In step S16, the operation mode of the camera corresponding to the switching operation is determined. In step S17, a Bv value, which is luminance of the object, is inputted by the light measurement processing circuit 15. Also, an Sv value, which is film sensitivity, is inputted from the film sensitivity reading circuit 14. Then, in step S18, a film exposing time is calculated based on Bv value and Sv value.

In step S19, the state of the first-stage (release) switch (1RSW) of the release switch 12 is discriminated. If 1RSW is ON, the operation goes to step S20, and if 1RSW is OFF, the operation goes back to step S6. In step S20, the display timer is initialized and the counting is started so as not to enter the standby mode. In step S21, the distance to the object is calculated based on data sent from the distance measuring circuit 18.

Further, the state of the second-stage (release) switch (2RSW) of the release switch 12 is discriminated. If 2RSW is ON, the operation goes to step S23, and if 2RSW is OFF, the operation goes back to step S6. In step S23, the communication of communication mode B is performed. The reason why data, which is necessary for determining the condition of date imprinting, is sent to the D-CPU 23 is that the D-CPU 23 can make preparations, which are necessary for imprinting date, while the exposing operation is performed by the M-CPU 10.

Thereafter, in step S24, the lens control circuit 21 drives the projection lens 27 in accordance with the distance of the object. In step S25, the exposing circuit 19 drives the lens shutter 25 in accordance with the exposing time. Then, if the exposure is ended, the communication of communication mode C is performed before the film 26 is wound up. In step S27, if the film for one frame is wound up by the film controlling circuit 20, the operation of the photograph is ended.

Figure 11:
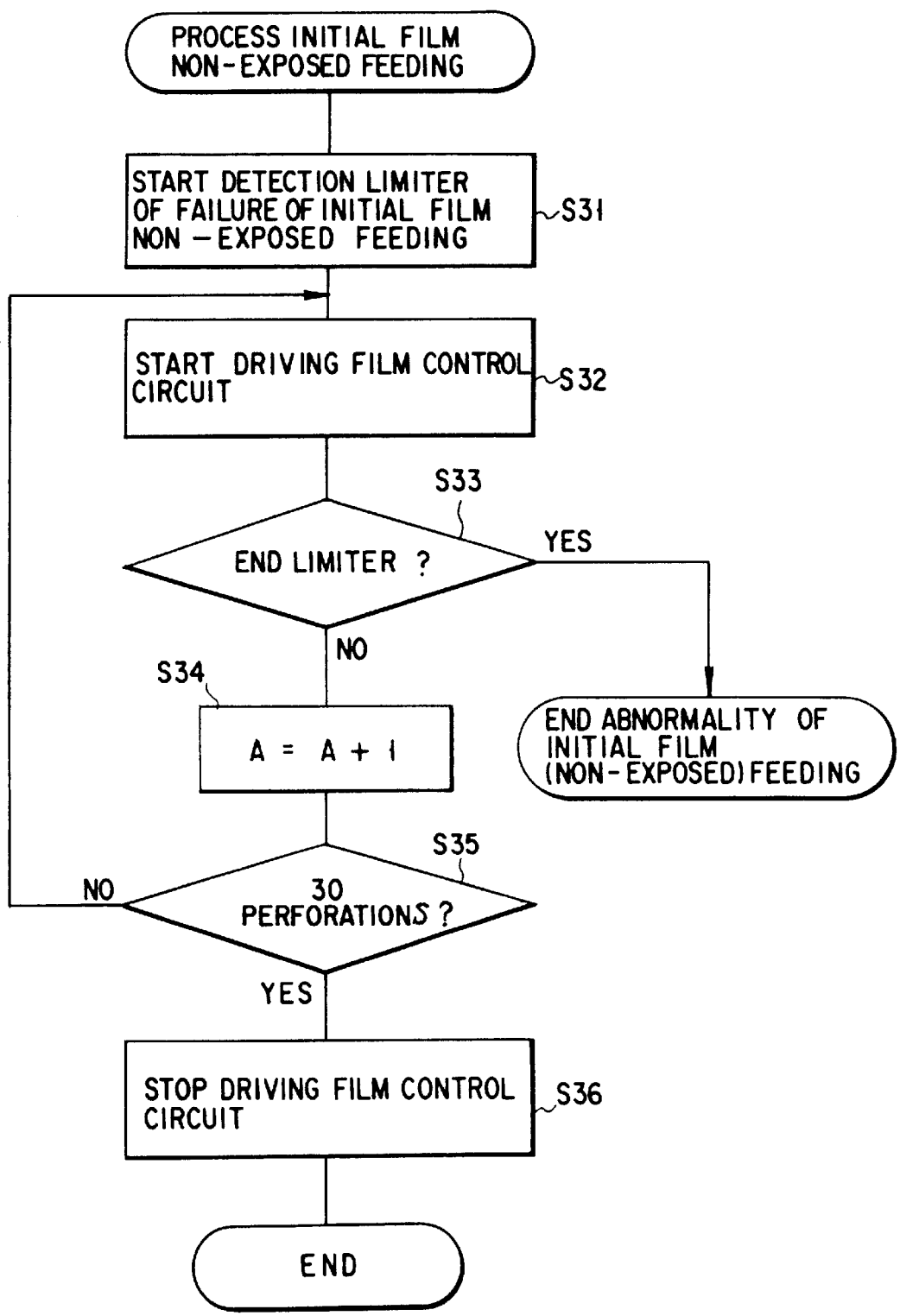
FIG. 11 is a flow chart explaining the operation of initial film (non-exposed) feeding processing.

The following will explain the operation of an initial film (non-exposed) feeding processing with reference to the flow chart of FIG. 11. In step S31, a limiter timer for detecting failure of initial film (non-exposed) feeding is started. In step S32, the film control circuit 20 for winding up the film is started to be driven.

In step S33, it is discriminated whether or not the limiter timer for detecting failure of initial film (non-exposed) feeding is ended. If the timer is ended, abnormality of initial film (non-exposed) feeding is ended. If the timer is not ended, the count value of the perforation of the film 26 is counted up by one in step S34. Thereafter, in step S35, the count value is compared with the value (30) stored in ROM (not shown) of the CPU so as to discriminate whether or not 30 perforations are moved. If 30 perforations are not moved, the operation goes back to step S32 and the film driving is continued till 30 perforations are moved.

Figure 10:
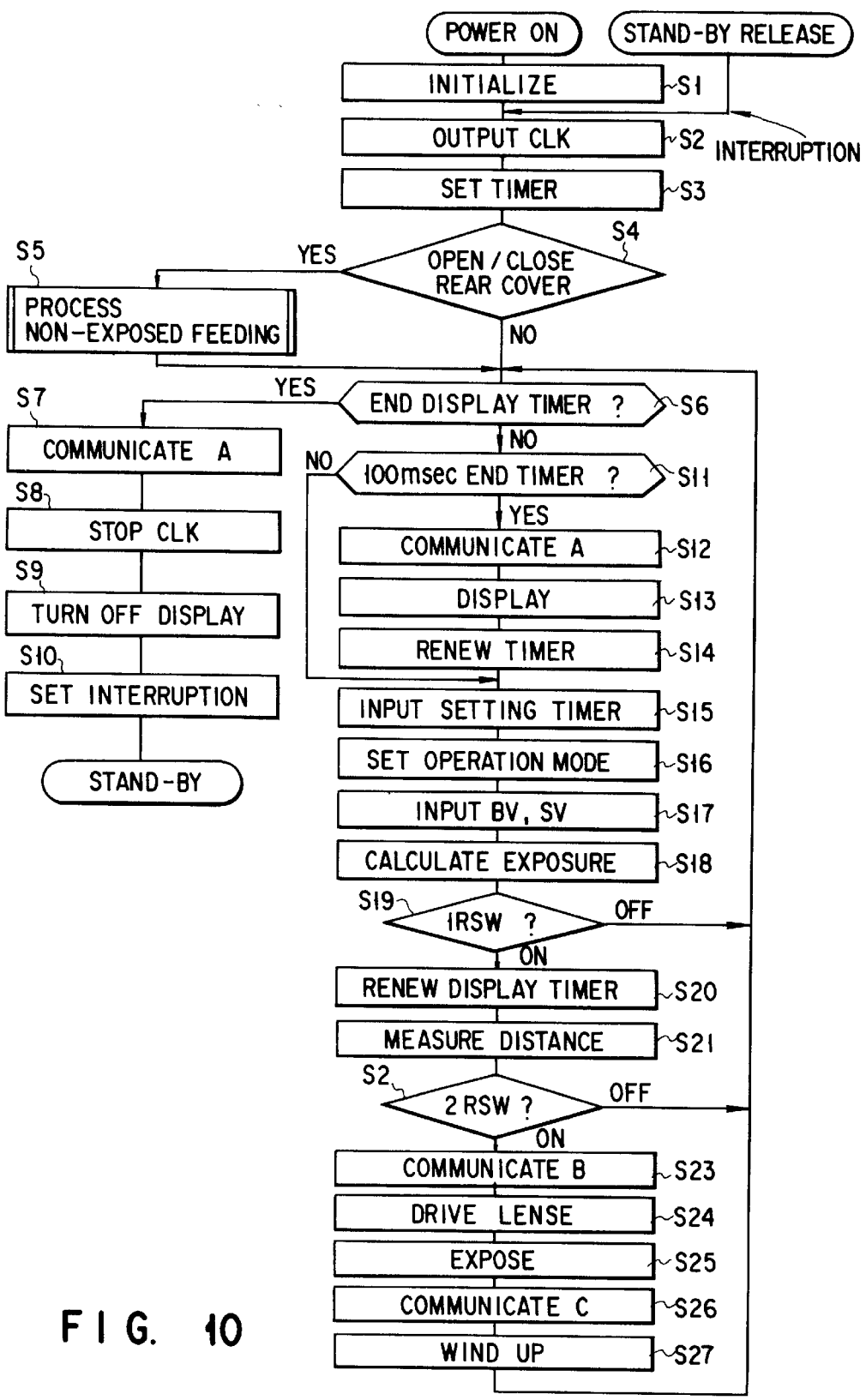
FIG. 10 is a flow chart explaining the operation of the main microcomputer.

Here, the perforation count value "A" of step S34 is initialized in step S1 shown in the flow chart of FIG. 10. After the film is moved, the operation goes to step S36, and the drive of the film control circuit 20 is stopped.

Figure 12:
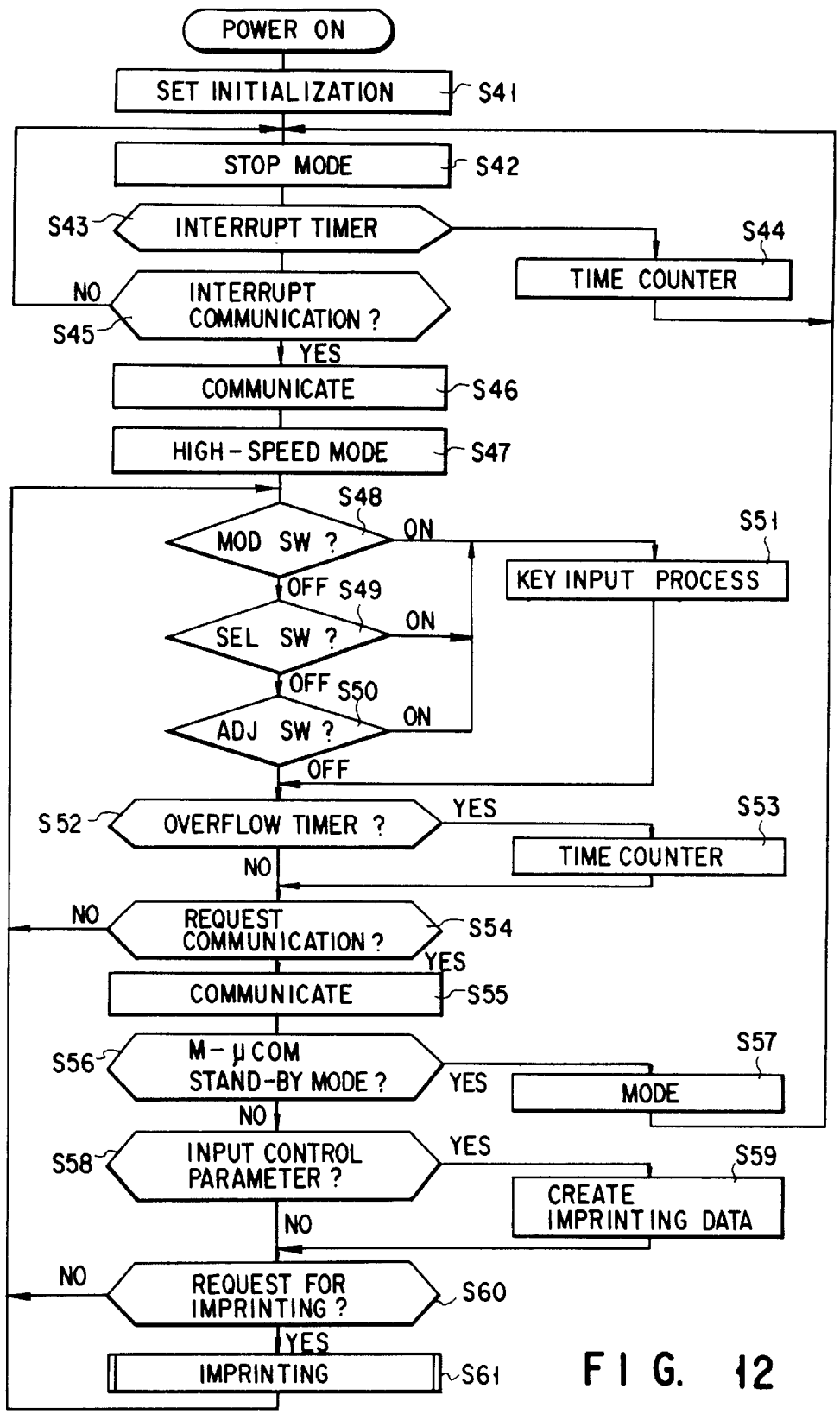
FIG. 12 is a flow chart explaining the operation of the date microcomputer.
Figure 44:
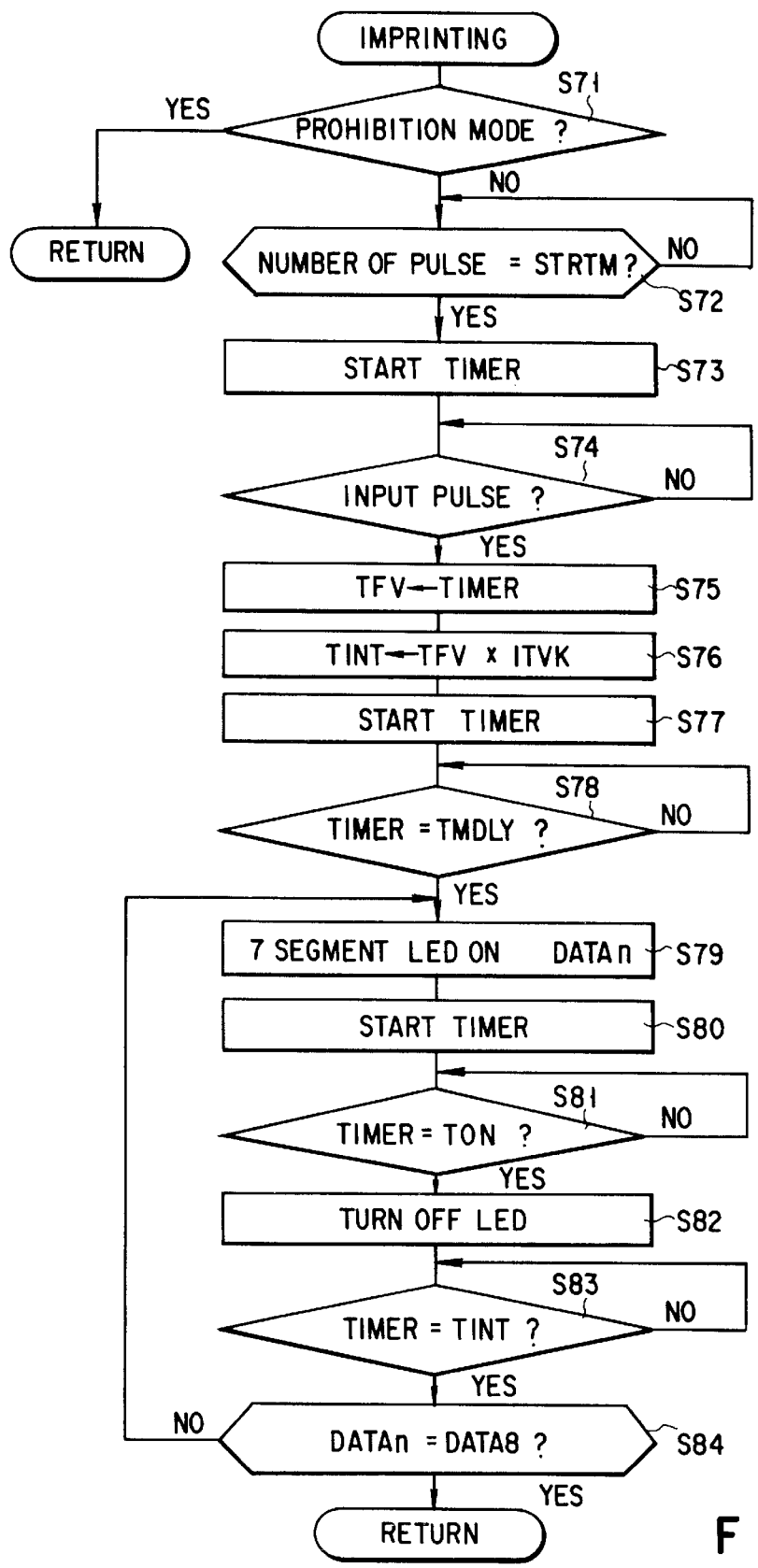

An operation of the D-CPU 23 will be explained with reference to the flow chart of FIG. 12.

In step S41, after power is ON and the D-CPU 23 is reset, the initialization is executed. In this initialization, predetermined data, which is used as the imprinting data, is inputted to a time counter. In step S42, the D-CPU 23 is set to be in a stop mode. During the stop mode, only the timer, which counts the clock of the oscillator, and the interruption function can be operated. The timer overflows every one second. This overflow is one of the interruption signals.

Therefore, the interruption signal is used as a reference clock, and five time counters (minute, hour, day, month, year) are counted up, thereby date data is created. Therefore, if interruption is generated by the time counter, the time counter is renewed by the processings of steps S43 and 44. If the renewal of the counter is finished, the operation goes back to step S42, and the D-CPU 23 is set to be in a stop mode.

If the M-CPU 10 is in an operating state, the M-CPU 10 periodically performs communication to the D-CPU 23. In other words, the CEN line is set from the L level to the H level. By the change of the CEN line, communication interruption is generated, the operation goes to steps S45 and S46. In step S46, the operation corresponding to each communication mode is performed. In step S47, a clock, which is sent from the M-CPU 10, is used as an operation clock. Therefore, the processing speed of the D-CPU 23 is improved.

In steps S48, S49, and S50, the states of three switches (MOD, SEL, ADJ) 31, 32, and 33, which are connected to the D-CPU 23, are discriminated. If it is discriminated that any one of switches is operated, the operation goes to step S51, and the operation corresponding to each switch is performed. If the MOD switch 31 is operated, the change of the imprinting mode and that of the display control data to be transmitted to the M-CPU 10 are performed. Also, if the SEL switch 32 is operated, the mode is set to be in the correcting state of date data, and a digit to be corrected is selected. Then, display control data is changed so as to flicker the selected digit. Further, if the ADJ switch 33 is operated, the content of the time counter corresponding to the selected digit is corrected.

In step S52, it is discriminated whether or not the timer overflows. If it is discriminated that the timer overflows, the processing of step S53 is performed so as to renew the timer counter. Then, in step S54, it is discriminated whether or not communication is requested from the state of the CEN line. If the CEN line is in the H level, the operation goes back to step S48, and if the CEN line is in the L level, the operation goes to step S55.

In step S55, the operation corresponding to each communication mode is performed. In step S56, the operation state of the M-CPU 10 is discriminated from the code showing the state of the camera. In this step, if the M-CPU 10 enters the standby mode, the operation goes to step S57, and the use of the clock sent from the M-CPU 10 is stopped. In this case, the oscillator 30 is used as an operation clock and the processing speed is lowered, and power consumption is reduced. On the other hand, if the M-CPU 10 is not in the standby mode in step S56, the operation goes to step S58. Then, if the control parameters 1, 2, 3, and 4 are inputted from the communication mode B, the operation goes to step S59.

Figure 13:
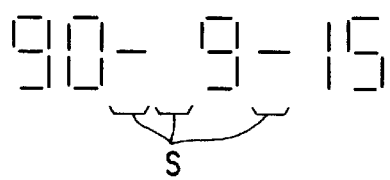
FIG. 13 is a view showing an example of data, which is lightened in a seven-segment LED, and is other than numerals.

In step S59, the product of STDTM and FKS, which are included in the control parameters 1 and 2, is calculated for the light-emitting time control of the 7-segment LED 28. The calculated value is used as a TON. Then, a counter value, which corresponds to imprint date data, is read from the time counter in accordance with the imprinting mode. The counter value is converted to data for lighting the 7-segment LED 28. Such data is 8-byte data including data excepting numerals. FIG. 13 shows data excepting numerals. For example, when date, 90 (year) 9 (month) 15 (day) is imprinted as shown in the drawing, the portions, which are shown by "S" are treated as data for lighting the 7-segment LED 28.

In step S60, it is discriminated whether or not the M-CPU 10 requests imprinting in the communication mode C. If the M-CPU 10 requests imprinting, sub-routine "imprinting" is executed in step S61.

The sub-routine "imprinting" will be explained with reference to the flow chart of FIG. 14.

In step S71, it is discriminated whether or not the mode is in a prohibition mode. If it is discriminated that the mode is in the prohibition mode, the operation is returned. If the M-CPU 10 starts winding up the film 26, a pulse signal is outputted from the film movement detecting section 39. In step S72, prior to the detection of the film speed, a predetermined number of pulses (=STRTM) are skipped. Then, in step S73, the timer counter is initialized in order to detect the film moving speed, thereafter the counter-up is started. The CPU processing waits in step S74 until the next pulse signal is outputted.

In step S74, if the pulse signal is detected, the operation goes to step S75, and the value of the timer counter is fetched as TFV. TFV is used as time data corresponding to the moving speed of the film 26. Then, in step S76, TFV is multiplied by a coefficient (ITVK), and TINT is obtained. The TINT determines the distance of the imprinting numerical (or signal).

Next, before lighting the 7-segment LED 28, standby time is set. In steps S77 and S78, imprinting is delayed for a predetermined period of time (TMDLY). In step S79, data for lighting the 7-segment LED 28 is outputted from an output port of the D-CPU 23. Thereby, imprint for one numeral is started.

In step S80, after the timer counter is initialized, the counter-up is started. The CPU processing waits in step S81 for imprinting the time (TON). Then, in step S82, the 7-segment LED 28 is turned off, imprinting for one numeral is ended.

In step S83, the CPU processing waits until timer counter=TINT. Thereby, the distance to the next numeral is formed. (Correctly, timer counter=TINT−TON, but there is no problem since TINT>>TON). Then, in step S84, it is discriminated whether or not imprint of data for 8-bytes is ended.

Data of DATA1 to DATA 8 is imprinted in order by the processings of steps S79 to S84.

Next, the following will explain a second embodiment in which the quantity of initial film (non-exposed) feeding is controlled, and the date is not imprinted on the final frame of the film. It is noted that the structure of the second embodiment is the same as that of the first embodiment of FIG. 4.

The quantity of winding up the film, which is necessary for imprinting the date data is three perforations. Among three perforations, it is 4.2 mm (one perforation) that data is actually imprinted (FIG. 2).

Therefore, if the quantity of winding up the final frame is set to two perforations or less, no imprinting is performed. Due to this, the quantity of initial film (non-exposed) feeding can be obtained by the following equation:

Quantity of Initial Film (non-exposed) Feeding=Full Length of Film−{(Length of One Frame×Number of Imaging Frames)+Quantity of Winding Up the Final Frame of the Film in which No Imprinting of Date Date is Started}

As explained in the first embodiment, if quantity of initial film (non-exposed) feeding is set to 32 perforations, quantity of winding up the final frame of the film, which is on sale, is 1 perforation or more and 5 perforations or less. In order to set 5 perforations, which is the maximum value, to 2 perforations or less, 3 perforations may be added to the quantity of initial film (non-exposed) feeding. Thereby, the quantity of winding up the final frame is 2 perforations or less, and imprinting of date data is not started.

The flow chart of FIG. 15 shows the processing of initial film (non-exposed) feeding of the second embodiment.

According to the embodiment, the quantity of the initial film (non-exposed) feeding is set to 32 perforations to 30 perforations, as described above. Thereby, in the case of the film in which the quantity of winding up the final frame is the maximum value of one perforation, if three perforations are subtracted, the number of imaging frames is reduced by one. At this time, the quantity of winding becomes 6 perforations. Therefore, date data cannot be set not to be imprinted onto the final frame. However, since it is possible to surely imprint date data onto the final frame which is reduced by one frame, no unclear picture is formed.

As mentioned above, according to the present invention, even if the DX code of film cartridge is not read, incomplete data can be prevented from being imprinted on the final frame of the film. Also, the camera can be miniaturized, and the manufacturing cost can be improved.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera capable of imprinting data on a 135 type photographing film, said photographing film having a film cut-out side which has a cut-out portion at a leader portion of said film, said camera comprising:

a detector for counting a number of perforations of said film cut-out side passing across said detector, said detector being arranged at a position where said detector is adjacent to the cut-out portion of a just-loaded film so that said detector is not covered with the leader portion of said film when said film in a cartridge is loaded in the camera and when the leader portion of said film extends from the cartridge toward said detector;

a film feeder for feeding said film out of the cartridge, with a total quantity of movement of said film being measured from the leader portion of the film by counting the number of perforations of said film passing across said detector after said cut-out portion passes said detector;

a winding control for enabling said film feeder to execute a one frame winding up operation of said film based on a detection result of said detector, after completion of a film exposing operation;

an imprinter for driving a light emitting element a plurality of times during said one frame winding up operation so as to optically imprint a plurality of data on said film; and an initial film feeding controller for enabling said film feeder to execute an initial film feeding operation from a first perforation of said film cut-out side after loading of said film in the camera and said film extends from the cartridge toward said detector without the leader portion of the film at the film cut-out side covering said detector, and after closing the back lid of the camera, after said film being fed by said film feeder, and after the leader portion of said film cut-out side being detected by said detector, wherein an amount of initial film feeding is preset at 30 perforations, so as to satisfy a following relation:

$$L > R \geq D$$

wherein

L: length of one frame of said photographing film corresponding to 8 perforations, D: amount of film movement necessary for imprinting data on a portion of the film corresponding to 3 perforations, and R: amount of winding movement after the final frame of said photographing film is exposed, the amount of which corresponds to a minimum value of 3 perforations and a maximum value of 7 perforations, thereby ensuring a sufficient amount R of the film winding movement required for imprinting data for the final frame of said film.

2. A camera having an area for receiving a film cartridge, and a back lid for closing the camera after loading the film cartridge in the camera, the camera further comprising:

a film feeder for feeding a photographing film, said film having a cut-out side which has a cut-out portion at a leading end portion of said film;

a film feeding amount detector for detecting an amount of feeding of said film cut-out side;

an initial film feeding controller for enabling said film feeder to execute an initial film feeding operation after loading a film cartridge in the camera, after closing the back lid of said camera, and after said film being fed by said film feeder;

a winding controller for enabling said film feeder to execute a one frame winding up operation based on a detection result of said detector after completion of a film exposing operation; and an imprinter for driving a light emitting element a plurality of times during said one frame winding up operation so as to optically imprint a plurality of data on said film;

said initial film feeding controller comprising:

a top end detector arranged between an exposure aperture and a film winding spool, for detecting a top end portion at a cut-out side of the film, said top end detector being arranged and located in said camera such that, when the film cartridge is just mounted in the camera, said top end detector is in relation with said cut-out portion of said film so that said top end detector is not covered by a leading end portion of said film at the film cut-out side;

a storing section for storing in advance an amount of film feeding to be performed in the initial film feeding operation, said amount of film feeding being preset in advance such that an amount of winding up after exposing a final frame of said film is sufficient for the imprinting operation of said imprinter; and a controller for feeding said film until said amount of film feeding reaches a stored value of said storing section after detecting said top end portion of said film by said top end detector.

3. The camera according to claim 2, wherein said top end detector detects a first perforation of the cut-out side of said film.

4. The camera according to claim 2, wherein:

said top end detector includes a device for detecting the perforations of said film so as to generate a pulse signal comprised of a plurality of pulses; and said film feeding amount detector counts the number of pulses of said pulse signal so as to detect the amount of feeding of said film.

* * * * *